(12) United States Patent
Shin et al.

(10) Patent No.: US 11,879,192 B2
(45) Date of Patent: Jan. 23, 2024

(54) APPARATUS AND METHOD FOR RECYCLING NONWOVEN FABRIC

(71) Applicant: S PLUS COMTECH CO., LTD., Seoul (KR)

(72) Inventors: Dong Soo Shin, Gwangmyeong-si (KR); Jin Seok No, Suwon-si (KR)

(73) Assignee: S PLUS COMTECH CO., LTD., Seoul (KR)

( * ) Notice: Subject to any disclaimer, the term of this patent is extended or adjusted under 35 U.S.C. 154(b) by 531 days.

(21) Appl. No.: 17/266,614

(22) PCT Filed: Aug. 22, 2019

(86) PCT No.: PCT/KR2019/010683
§ 371 (c)(1),
(2) Date: Feb. 8, 2021

(87) PCT Pub. No.: WO2020/045894
PCT Pub. Date: Mar. 5, 2020

(65) Prior Publication Data
US 2021/0292943 A1    Sep. 23, 2021

(30) Foreign Application Priority Data

Aug. 31, 2018    (KR) .................. 10-2018-0103562

(51) Int. Cl.
*D04H 1/4274*    (2012.01)
*D01G 11/00*    (2006.01)
(Continued)

(52) U.S. Cl.
CPC .......... *D04H 1/4274* (2013.01); *D01G 11/00* (2013.01); *D01G 5/00* (2013.01); *D01G 7/00* (2013.01); *Y02W 30/66* (2015.05)

(58) Field of Classification Search
CPC ...... D01G 11/00; D01G 11/04; D04H 1/4274; Y02W 30/66
See application file for complete search history.

(56) References Cited

U.S. PATENT DOCUMENTS 6,037,282 A    3/2000 Milding et al.
6,378,179 B1 *  4/2002 Hirsch ................ D04H 1/4274
                                              28/103
(Continued)

FOREIGN PATENT DOCUMENTS

CN    206635507 U    11/2017
JP    10-504613 A     5/1998
(Continued)

OTHER PUBLICATIONS

Machine Translation of CN 206635507, obtained Sep. 18, 2023.*
International Search Report for PCT/KR2019/010683 dated Dec. 2, 2019 from Korean Intellectual Property Office.

*Primary Examiner* — Shaun R Hurley
(74) *Attorney, Agent, or Firm* — Revolution IP, PLLC

(57) ABSTRACT

The present invention provides a nonwoven fabric recycling apparatus and a nonwoven fabric recycling method using same, the apparatus including: a mixing tank in which pulverized waste nonwoven fabric bodies and a filler are dispersed in water and mixed with each other to form a waste nonwoven fabric mixture; a fixing agent addition part for supplying a fixing agent for aggregating the pulverized waste nonwoven fabric bodies and the filler to the nonwoven fabric mixture to form a recycling raw material; and a filter tank in which the recycling raw material supplied thereto is received so that a recycling sheet is formed.

9 Claims, 4 Drawing Sheets

(51) Int. Cl.
*D01G 5/00* (2006.01)
*D01G 7/00* (2006.01)

(56) References Cited

U.S. PATENT DOCUMENTS

| | | | |
|---|---|---|---|
| 2006/0191655 A1* | 8/2006 | Nunn | D04H 1/732 |
| | | | 162/146 |
| 2010/0051221 A1* | 3/2010 | Griffiths | D04H 1/72 |
| | | | 162/146 |
| 2021/0291464 A1* | 9/2021 | Shin | B29B 7/88 |

FOREIGN PATENT DOCUMENTS

| | | |
|---|---|---|
| KR | 10-0866648 B1 | 11/2008 |
| KR | 10-0974173 B1 | 8/2010 |
| KR | 10-2012-0111224 A | 10/2012 |
| KR | 10-2018-0019391 A | 2/2015 |
| KR | 10-1595438 B1 | 2/2016 |

* cited by examiner

APPARATUS AND METHOD FOR RECYCLING NONWOVEN FABRIC

TECHNICAL FIELD

The present invention relates to technology of recycling nonwoven fabrics, and more particularly, to an apparatus and a method for producing a recycling nonwoven fabric by using a waste nonwoven fabric.

BACKGROUND ART

As a prior-art patent document related to the technology of producing recycling nonwoven fabrics by using waste nonwoven fabrics, Korean Patent Registration No. 10-0974173 discloses a process, whereby waste nonwoven fabrics are cut to a certain size in a cutting device and then the cut waste nonwoven fabrics are temporarily stored in a storage unit, the waste nonwoven fabrics stored in the storage unit are sprayed on a low melting point fiber layer with an airlaid, a surface layer is formed with short fibers and then is needle punched using a needle punching device to apply pressure with a pressurizing unit having a high temperature and to press, thereby producing recycling nonwoven fabrics.

DETAILED DESCRIPTION OF THE INVENTION

Technical Problem

The present invention provides an apparatus for recycling a nonwoven fabric so as to produce a recycling nonwoven fabric by using a waste nonwoven fabric, and a method of recycling a nonwoven fabric using the apparatus.

Technical Solution

According to an aspect of the present invention, there is provided an apparatus for recycling a nonwoven fabric, the apparatus including: a mixing tank in which pulverized waste nonwoven fabric bodies and a filler are dispersed in water and mixed with each other to form a waste nonwoven fabric mixture; a fixing agent addition part for supplying a fixing agent for aggregating the pulverized waste nonwoven fabric bodies and the filler to the nonwoven fabric mixture to form a recycling raw material; and a filter tank in which the recycling raw material supplied thereto is received so that a recycling sheet is formed, wherein the filter tank includes a filter tank body for providing an inner space, and a filter net horizontally installed in the inner space so as to divide the inner space into an upper space and a lower space and allowing water in the recycling raw material to pass therethrough downward, and the recycling raw material is supplied to the upper space.

According to another aspect of the present invention, there is provided a method of recycling a nonwoven fabric, the method including: a waste nonwoven fabric pulverizing operation of pulverizing a waste nonwoven fabric to obtain pulverized waste nonwoven fabric bodies; a material mixing operation of dispersing the pulverized waste nonwoven fabric bodies and a filler in water and mixing with each other to obtain a waste nonwoven fabric mixture; a fixing agent adding operation of supplying the fixing agent for aggregating the pulverized nonwoven fabric bodies and the filler to the waste nonwoven fabric mixture to form a recycling raw material; a raw material injecting operation of injecting the recycling raw material into an upper space of the filter tank, wherein the filter tank includes a filter tank main body for providing an inner space and a filter net horizontally installed in the inner space so as to divide the inner space into the upper space and a lower space and allowing water in the recycling raw material to pass therethrough downward; and a draining operation of draining water from the lower space to form a recycling sheet on the filter net.

Effects of the Invention

According to the present invention, all the objectives of the present invention described above can be achieved. Specifically, since a fixing agent is added to a nonwoven fabric mixture formed by mixing pulverized waste nonwoven fabric bodies and a filler dispersed in water with each other, and then supplied to a filter tank to obtain a nonwoven fabric recycling sheet through a drainage process, the process can be simplified compared to the related art and as such, the effects of cost reduction and productivity improvement can be expected.

MODE OF THE INVENTION

Hereinafter, the configuration and operation of embodiments of the present invention will be described with reference to the accompanying drawings.

Figure 1:
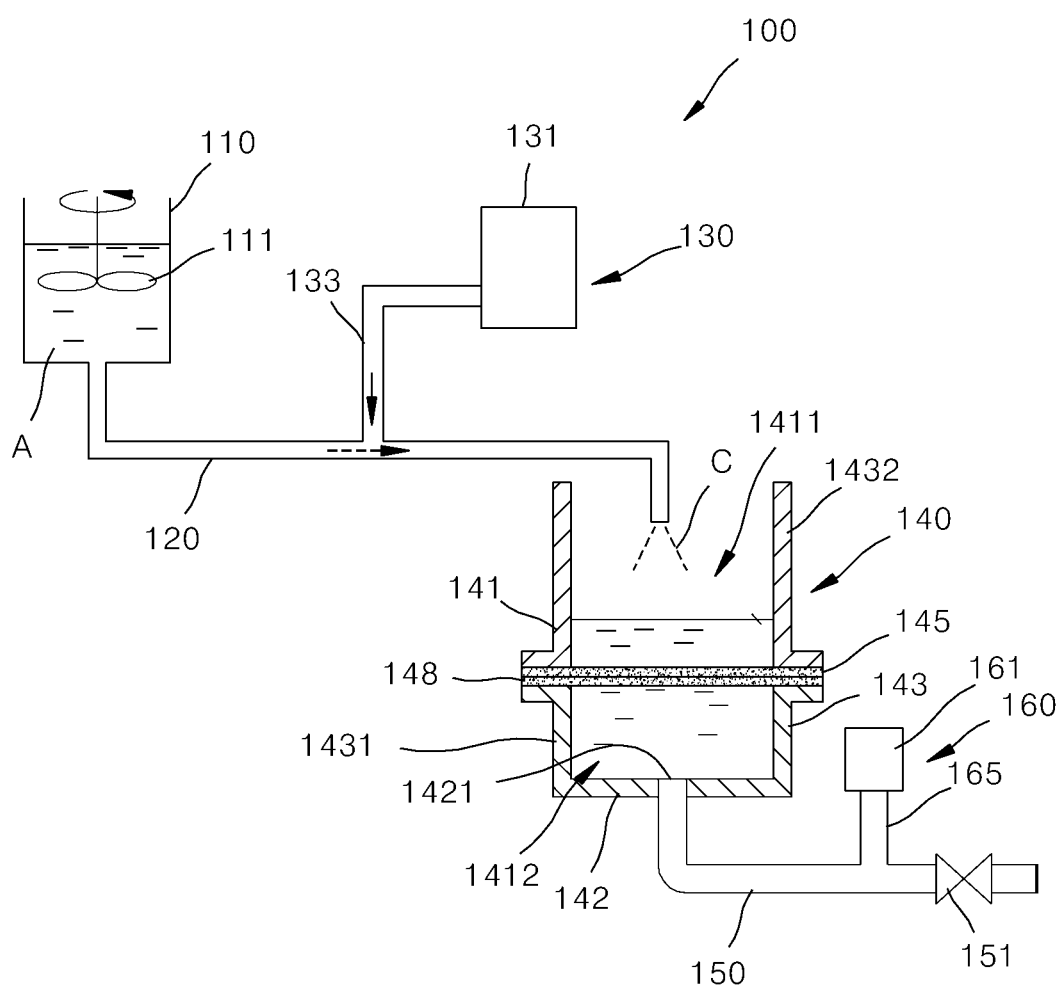
FIG. 1 is a view schematically illustrating an apparatus for recycling a nonwoven fabric according to an embodiment of the present invention.

FIG. 1 is a view schematically illustrating an apparatus for recycling a nonwoven fabric according to an embodiment of the present invention. Referring to FIG. 1, an apparatus 100 for recycling a nonwoven fabric according to an embodiment of the present invention includes a mixing tank 110 in which pulverized waste nonwoven bodies and a filler are dispersed in water and mixed with each other to form a waste nonwoven fabric mixture, a mixture transfer pipe 120 through which the waste nonwoven fabric mixture is discharged from the mixing tank 110, a fixing agent addition part 130 for adding a fixing agent to the waste nonwoven fabric mixture discharged from the mixing tank 110 on the mixture transfer pipe 120, a filter tank 140 in which a recycling sheet is formed by using a recycling raw material formed by adding the fixing agent to the waste nonwoven fabric mixture, a drainage pipe 150 through which water is discharged from the filter tank 140, and a vacuum forming unit 160 connected to the drainage pipe 150.

In the mixing tank 110, the pulverized waste nonwoven bodies and the filler are dispersed in water and mixed with each other to form a waste nonwoven fabric mixture A. To this end, the mixing tank 110 includes an agitating unit 111. The pulverized waste nonwoven bodies are obtained by finely pulverizing a nonwoven fabric waste or nonwoven fabric scrap generated in the manufacturing process of a nonwoven fabric product by using a pulverizer. It is preferable that the pulverized waste nonwoven fabric bodies having the same properties are supplied to the mixing tank 110. It is preferable that the pulverized waste nonwoven fabric bodies have a length of 10 mm or less. As the filler, various functional fillers including resin materials for bonding and controlling properties of the pulverized waste nonwoven fabric bodies are used. In the mixing tank 110, the pulverized waste nonwoven fabric bodies and the filler are supplied in a state in which the mixing tank 110 is filled with water, and the pulverized waste nonwoven fabric bodies and the filler supplied to water are evenly dispersed and mixed in water by the agitating unit 111. In the present embodiment, the pulverized waste nonwoven fabric bodies and the filler in the waste nonwoven fabric mixture A have a weight ratio of 8:2.

The waste nonwoven fabric mixture A discharged from the mixing tank 110 is transferred to the filter tank 140 through the transfer pipe 120. To this end, although not shown, the mixture transfer pipe 120 includes a transfer pump and an opening/closing valve for transferring the waste nonwoven fabric mixture A. The fixing agent addition part 130 is connected to the transfer pipe 120 so that the fixing agent is supplied to the waste nonwoven fabric mixture A flowing through the transfer pipe 120.

The fixing agent addition part 130 supplies the fixing agent to the transfer pipe 120 to add the fixing agent to the waste nonwoven fabric mixture A flowing in the transfer pipe 120. The pulverized waste nonwoven fabric bodies included in the waste nonwoven fabric mixture A is structurally aggregated by the fixing agent added to the waste nonwoven fabric mixture A through the fixing agent addition part 130 and thus may be fixed to each other. The fixing agent may be one commonly used, such as polyvinyl acetate resin and sodium thiosulfate. The fixing agent addition part 130 includes a fixing agent storage tank 131 in which the fixing agent is stored, and a fixing agent supply pipe 133 that connects the fixing agent storage tank 131 to the transfer pipe 120 and supplies the fixing agent stored in the fixing agent storage tank 131 to the transfer pipe 120. Although not shown, the fixing agent addition part 130 further includes a pump for supplying the fixing agent stored in the fixing agent storage tank 131 to the transfer pipe 120 through the fixing agent supply pipe 133, and an opening/closing valve for opening and closing the fixing agent supply pipe 133. In the present invention, the addition of the fixing agent to the waste nonwoven fabric mixture A is referred to as a recycling raw material.

In the filter tank 140, the recycling sheet is manufactured by using the recycling raw material formed by adding the fixing agent to the waste nonwoven fabric mixture. The filter tank 140 includes a filter tank main body 141, a filter net 145 installed inside the filter tank main body 141, and a net support body 148 installed inside the filter tank main body 141 to support the filter net 145.

The filter tank main body 141 includes a bottom 142 and a sidewall 143 extending upwardly from the bottom 142. The bottom 142 is provided with a drainage port 1421 for drainage. The sidewall 143 includes an upper sidewall 1432 that is detachably coupled up and down, and a lower sidewall 1431 formed integrally with the bottom 142. The filter net 145 and the net support body 148 are installed between the upper sidewall 1432 and the lower sidewall 1431. The inner space of the filter tank main body 141 is divided into an upper space 1411 and a lower space 1412 by the filter net 145.

The filter net 145 is installed so as to be horizontally disposed inside the filter tank main body 141. Specifically, the filter net 145 is detachably coupled between the upper sidewall 1432 and the lower sidewall 1431. The filter net 145 allows water that is the rest of the recycling raw material to pass, except for the aggregate of the pulverized waste nonwoven fabric bodies and the filler. Water is drained downwardly by the filter net 145, and a recycling sheet made of the aggregate of the pulverized waste nonwoven fabric bodes and the filler remains on the top. The filter net 145 is structurally supported by the net support body 148.

The net body support 148 is installed inside the filter tank main body 141 to support the filter net 145. Specifically, the net support body 148 is detachably coupled between the upper side wall 1432 and the lower side wall 1431 and is positioned under the filter net 145 to structurally support the filter net 145.

The drainage pipe 150 extends from the drainage port 1421 formed in the bottom 142 of the filter tank main body 141. Water is discharged to the outside from the inner space of the filter tank main body 141 through the drainage pipe 150. A drainage valve 151 for opening and closing the drainage pipe 150 is installed in the drainage pipe 150. In the present embodiment, it is described that water is drained through the drainage pipe 150 by its own weight. Unlike this, a drainage pump may be installed so that water may be drained by the drainage pump. The vacuum forming unit 160 is connected to the drainage pipe 150.

The vacuum forming unit 160 discharges air inside the filter tank 140 to the outside through the drainage pipe 150 to form a vacuum in the lower space 1412 of the filter tank 140. The vacuum forming unit 160 includes a vacuum pump 161 and a connection pipe 165 connecting the vacuum pump 161 and the drainage pipe 150. A portion to which the connection pipe 165 and the drainage pipe 150 are connected, is located upstream of the drainage valve 151. The vacuum pump 161 operates to form a vacuum state in the lower space 1412 of the filter tank 140, thereby reducing moisture in the recycling sheet formed on the filter net 145.

Figure 2:
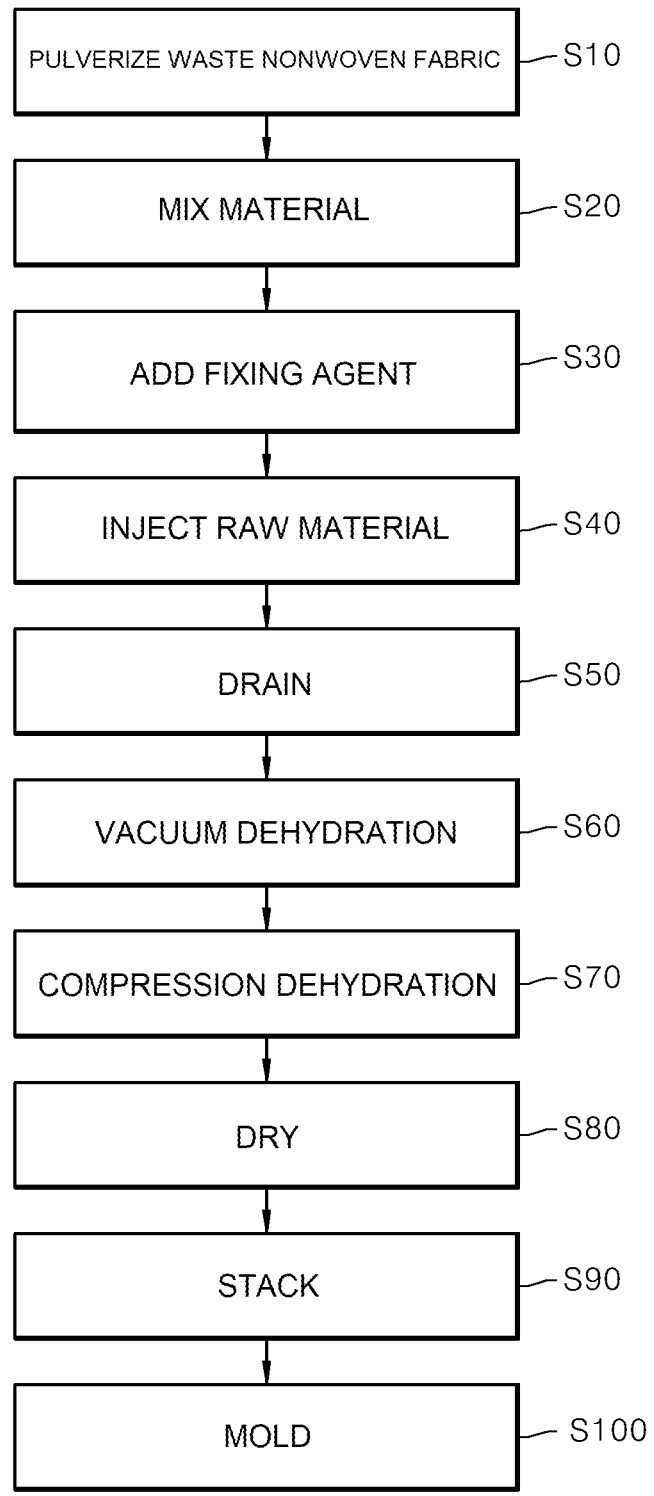
FIG. 2 is a flowchart illustrating a method of recycling a nonwoven fabric according to an embodiment of the present invention using the apparatus for recycling a nonwoven fabric shown in FIG. 1.

FIG. 2 is a flowchart illustrating a method of recycling a nonwoven fabric according to an embodiment of the present invention using the apparatus for recycling a nonwoven fabric shown in FIG. 1. A description of the method for recycling a nonwoven fabric shown in FIG. 2 will also include a description of the operation of the apparatus for recycling a nonwoven fabric shown in FIG. 1. Referring to FIG. 2, the method of recycling a nonwoven fabric according to an embodiment of the present invention includes a waste nonwoven fabric pulverizing operation (S10) of pulverizing a waste nonwoven fabric to obtain pulverized waste nonwoven fabric bodies, a material mixing operation (S20) of dispersing the pulverized nonwoven fabric bodies obtained through the waste nonwoven fabric pulverizing operation (S10) and a filler in water and mixing with each other to obtain a nonwoven fabric mixture, a fixing agent adding operation (S30) of adding a fixing agent to the nonwoven fabric mixture obtained through the material mixing operation (S20) to prepare a recycling raw material, a raw material injecting operation (S40) of injecting the recycling raw material prepared through the fixing agent adding operation (S30) into a filter tank, a draining operation (S50) of draining water from the filter tank to form a recycling sheet, a vacuum dehydration operation (S60) of reducing moisture in the recycling sheet by forming a vacuum in the filter tank, a compression dehydration operation (S70) of compressing and dehydrating the recycling sheet that has undergone the vacuum dehydration operation (S60), a drying operation (S80) of drying the recycling sheet that has undergone the compression dehydration operation (S70), a stacking operation (S90) of stacking a plurality of recycling sheets that have undergone the drying operation (S80), and a molding operation (S100) of molding a laminate formed in the stacking operation (90). The material mixing operation (S20), the fixing agent adding operation (S30), the raw material injecting operation (S40), the draining operation (S50), and the vacuum dehydration operation (S60) may be performed by using the apparatus 100 for recycling a nonwoven fabric according to an embodiment of the present invention described with reference to FIG. 1.

In the waste nonwoven fabric pulverizing operation (S10), the nonwoven scrap or nonwoven waste generated in the manufacturing process of the nonwoven fabric product is pulverized by a pulverizer to form pulverized waste nonwoven fabric. In the waste nonwoven fabric pulverizing operation (S10), the pulverized waste nonwoven fabric bodies may be preferably pulverized to have a length of 10 mm or less.

In the material mixing operation (S20), the pulverized waste nonwoven fabric bodies obtained through the waste nonwoven fabric pulverizing operation (S10) and a filler are dispersed in water and mixed with each other to obtain a nonwoven fabric mixture. The material mixing operation (S20) is performed in the mixing tank 110 of the apparatus for recycling a nonwoven fabric shown in FIG. 1. In the mixing tank 110, the pulverized waste nonwoven fabric bodies and the filler are dispersed in water and mixed with each other to form a waste nonwoven fabric mixture A. It is preferable that the pulverized waste nonwoven fabric bodies used in the material mixing operation (S20) have the same properties. As the filler, various functional fillers including resin materials for bonding and controlling properties of the pulverized waste nonwoven fabric bodies are used. In the mixing tank 110, the pulverized nonwoven fabric bodies and the filler are supplied in a state in which the mixing tank 110 is filled with water, and the pulverized waste nonwoven fabric bodies and the filler supplied to the water are evenly dispersed and mixed in water by the agitating unit 111. In the present embodiment, the pulverized nonwoven fabric bodies and the filler in the waste nonwoven fabric mixture A have a weight ratio of 8:2.

In the fixing agent adding step (S30), the fixing agent is added to the nonwoven fabric mixture A obtained through the material mixing operation to prepare a raw material of a recycling nonwoven fabric. The fixing agent adding operation (S30) is performed by operating the fixing agent addition part 130 in the process of moving the waste nonwoven fabric mixture A stored in the mixing tank 110 in the apparatus 100 for recycling nonwoven fabric shown in FIG. 1 to the filter tank 140 through the transfer pipe 120. The fixing agent adding part 130 supplies the fixing agent to the transfer pipe 120 to add the fixing agent to the waste nonwoven fabric mixture A flowing in the transfer pipe 120. The pulverized waste nonwoven fabric bodies contained in the waste nonwoven fabric mixture A are structurally aggregated by the fixing agent added to the waste nonwoven fabric mixture A through the fixing agent addition part 130 and thus may be fixed to each other. The fixing agent may be one commonly used, such as polyvinyl acetate resin and sodium thiosulfate.

In the raw material injecting operation (S40), the recycling raw material prepared through the fixing agent adding operation (S30) is injected into the filter tank. When the raw material injecting operation (S40) is described in more detail with reference to FIG. 1, the recycling raw material C is discharged from the transfer pipe 120 in a state in which water is filled higher than the filter net 145 in the filter tank 140, and an appropriate amount is supplied to the upper space 1411 of the filter tank 140. The recycling raw material injected into the filter tank 140 is present only in the upper space 1411 by the filter net 145.

Figure 3:
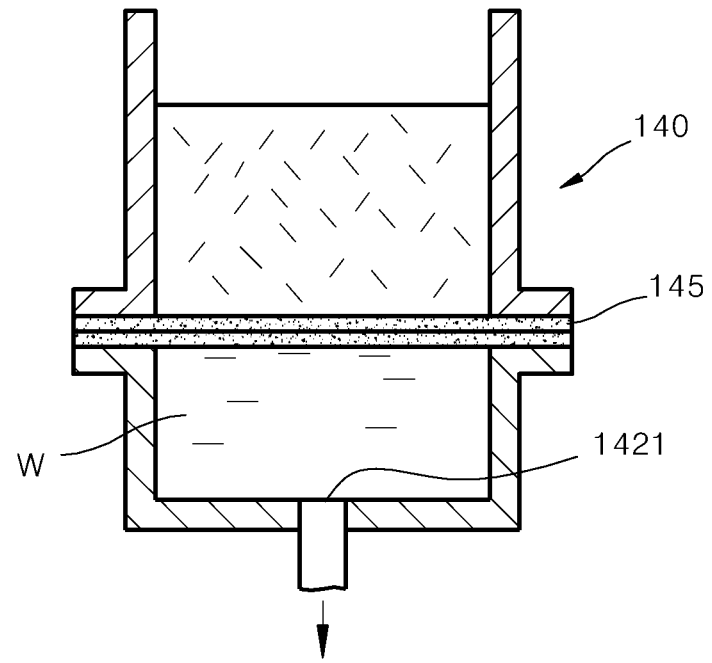
FIG. 3 illustrates the state of a filter tank when a draining operation of the method of recycling a nonwoven fabric of FIG. 2 is performed.
Figure 4:
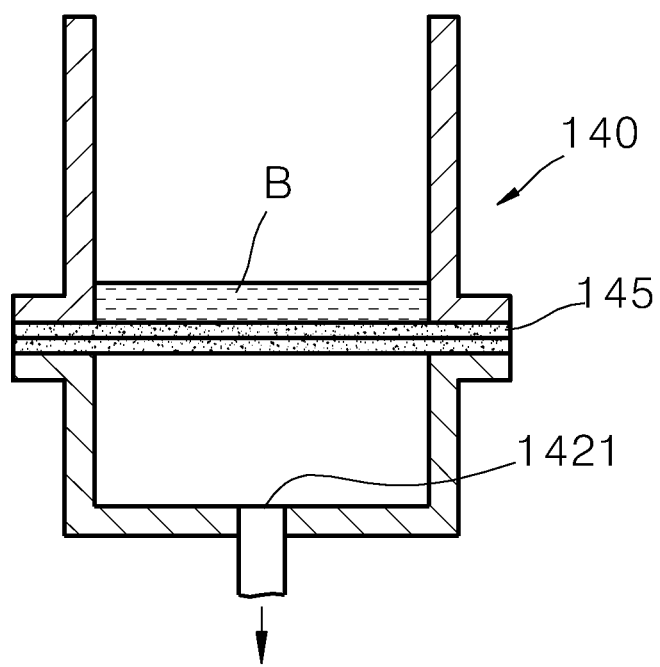
FIG. 4 illustrates the state of the filter tank when a vacuum dehydration operation of the method of recycling a nonwoven fabric of FIG. 2 is performed.

In the draining operation (S50), as shown in FIG. 3, water is drained from the filter tank 140 through the drainage port 1421. The draining operation S50 is performed by opening the drainage valve 151 installed in the drainage pipe 150. After the water in the filter tank 140 is completely drained through the draining operation (S50), as shown in FIG. 4, in the filter tank 140, only the recycling raw material aggregated on the filter net 145 remains, so that the recycling sheet B may be formed. The recycling sheet B formed after the draining operation (S50) contains a considerable amount of water, and contains about 120% of water compared to the recycling sheet B.

In the vacuum dehydration operation (S60), a vacuum is formed in the filter tank 140 to reduce moisture in the recycling sheet B. The vacuum dehydration operation (S60) is performed by operating the vacuum pump 161 while the drainage valve 151 is closed. The lower space 1412 of the filter tank 140 is sealed by the recycling sheet B stacked on the filter net 145, and the air in the lower space 1412 passes through the drainage pipe 150 by the vacuum pump 161 so that a vacuum state may be formed in the lower space 1412. Thus, moisture contained in the recycling sheet B is additionally removed. By performing the vacuum dehydration operation (S60), the moisture content of the recycling sheet B is lowered to a level of about 70% compared to the recycling sheet B.

Figure 5:
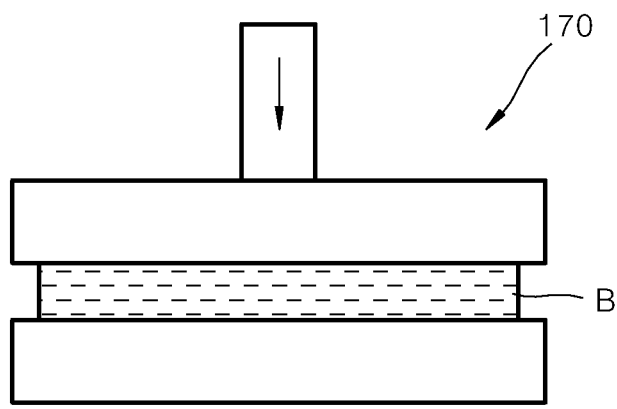
FIG. 5 illustrates the state of the filter tank when a compression dehydration operation of the method of recycling a nonwoven fabric of FIG. 2 is performed.

In the compression dehydration operation (S70), the recycling sheet B that has undergone the vacuum dehydration operation (S60) is compressed by a press 170 to be additionally dehydrated, as shown in FIG. 5. By performing the compression dehydration operation (S70), the moisture content of the recycling sheet B is lowered to about 40% compared to the recycling sheet B. In the present embodiment, it is described that compression is performed on one recycling sheet B in the compression dehydration operation (S70). However, unlike this, it may be performed by compressing at the same time in a state in which several recycling sheets B are stacked. It also belongs to the scope of the present invention.

In the drying operation (S80), the recycling sheet B that has undergone the compression dehydration operation (S70) is heat-treated and dried in a high-temperature furnace. By performing the drying operation (S80), the moisture content of the recycling sheet B is lowered to a level of about 3% compared to the recycling sheet B. Although not shown, a shape blanking operation of punching the recycling sheet B that has undergone the compression dehydration operation (S70) before the drying operation (S80) is performed into a shape close to a finished product may be further performed.

Figure 6:
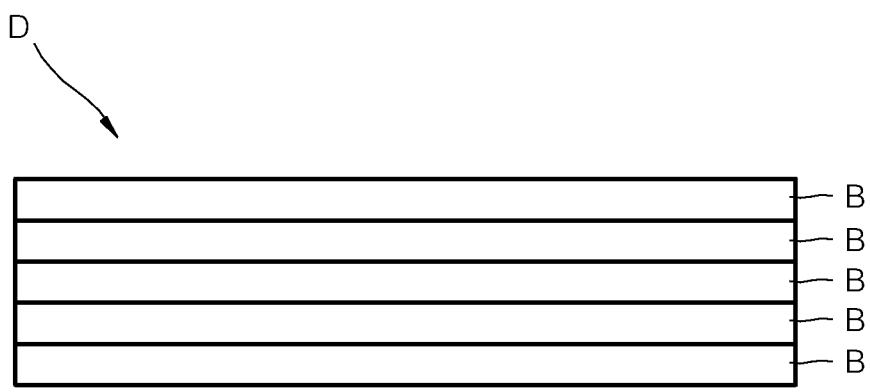
FIG. 6 is a side view illustrating a laminate formed by a stacking operation of the method of recycling a nonwoven fabric of FIG. 2.

In the stacking operation (S90), a plurality of recycling sheets B that have undergone the drying operation (S80) are stacked and bonded to form a laminate. FIG. 6 is a side view of a laminate D formed through the stacking operation (S90).

In the molding operation (S100), the laminate formed in the stacking operation (S90) is molded into the finished product by using a mold.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of recycling a nonwoven fabric, the method comprising:
   a waste nonwoven fabric pulverizing operation of pulverizing a waste nonwoven fabric to obtain pulverized waste nonwoven fabric bodies;
   a material mixing operation of dispersing the pulverized waste nonwoven fabric bodies and a filler in water and mixing with each other to obtain a waste nonwoven fabric mixture;
   a fixing agent adding operation of supplying the fixing agent for aggregating the pulverized nonwoven fabric bodies and the filler to the waste nonwoven fabric mixture to form a recycling raw material;
   a raw material injecting operation of injecting the recycling raw material into an upper space of a filter tank, wherein the filter tank comprises a filter tank main body for providing an inner space and a filter net horizontally installed in the inner space so as to divide the inner space into the upper space and a lower space and allowing water in the recycling raw material to pass therethrough downward;
   a draining operation of draining water from the lower space to form a recycling sheet on the filter net; and
   after the draining operation is performed, a vacuum dehydration operation of discharging air in the lower space to dehydrate the recycling sheet.

2. The method of claim 1, wherein the pulverized waste nonwoven fabric bodies mixed in the nonwoven fabric mixture have same properties.

3. The method of claim 1, wherein, in the raw material injecting operation, the recycling raw material is injected in a state in which water is filled higher than the filter net in the inner space.

4. The method of claim 1, further comprising stacking a plurality of recycling sheets.

5. The method of claim 1, wherein the pulverized waste nonwoven fabric bodies are formed to have a length of 10 mm or less.

6. A method of recycling a nonwoven fabric, the method comprising:
   a waste nonwoven fabric pulverizing operation of pulverizing a waste nonwoven fabric to obtain pulverized waste nonwoven fabric bodies;
   a material mixing operation of dispersing the pulverized waste nonwoven fabric bodies and a filler in water and mixing with each other to obtain a waste nonwoven fabric mixture;
   a fixing agent adding operation of supplying the fixing agent for aggregating the pulverized nonwoven fabric bodies and the filler to the waste nonwoven fabric mixture to form a recycling raw material;
   a raw material injecting operation of injecting the recycling raw material into an upper space of a filter tank, wherein the filter tank comprises a filter tank main body for providing an inner space and a filter net horizontally installed in the inner space so as to divide the inner space into the upper space and a lower space and allowing water in the recycling raw material to pass therethrough downward;
   a draining operation of draining water from the lower space to form a recycling sheet on the filter net; and
   a compression dehydration operation of compressing and dehydrating the recycling sheet.

7. The method of claim 6, further comprising stacking a plurality of recycling sheets.

8. A method of recycling a nonwoven fabric, the method comprising:
   a waste nonwoven fabric pulverizing operation of pulverizing a waste nonwoven fabric to obtain pulverized waste nonwoven fabric bodies;
   a material mixing operation of dispersing the pulverized waste nonwoven fabric bodies and a filler in water and mixing with each other to obtain a waste nonwoven fabric mixture;
   a fixing agent adding operation of supplying the fixing agent for aggregating the pulverized nonwoven fabric bodies and the filler to the waste nonwoven fabric mixture to form a recycling raw material;
   a raw material injecting operation of injecting the recycling raw material into an upper space of a filter tank, wherein the filter tank comprises a filter tank main body for providing an inner space and a filter net horizontally installed in the inner space so as to divide the inner space into the upper space and a lower space and allowing water in the recycling raw material to pass therethrough downward;
   a draining operation of draining water from the lower space to form a recycling sheet on the filter net; and
   a drying operation of heat-treating and drying the recycling sheet.

9. The method of claim 8, further comprising stacking a plurality of recycling sheets.

* * * * *